United States Patent [19]

Anderson

[11] Patent Number: 4,773,494

[45] Date of Patent: Sep. 27, 1988

[54] HYDRAULICALLY DRIVE WHEELCHAIR

[76] Inventor: Gene Anderson, Country Manor, 1004 Kildare Ct., Geneseo, Ill. 61254

[21] Appl. No.: 785,347

[22] Filed: Oct. 7, 1985

[51] Int. Cl.4 ............................................ B62D 11/04

[52] U.S. Cl. .................................. 180/6.48; 180/907; 280/242 WC; 297/180; 297/DIG. 4

[58] Field of Search ........................ 180/6.48, 6.2, 6.3, 180/907, 65.2; 280/242 WC; 297/DIG. 4, 180

[56] References Cited

U.S. PATENT DOCUMENTS

| | | | |
|---|---|---|---|
| 3,738,702 | 6/1973 | Jacobs | 297/180 |
| 3,814,199 | 6/1974 | Jones | 180/907 X |
| 3,964,786 | 6/1976 | Mashuda | 280/242 WC X |
| 4,098,144 | 7/1978 | Besel et al. | 180/65.2 X |
| 4,114,737 | 9/1978 | Fukui | 180/6.48 X |
| 4,199,036 | 4/1980 | Wereb | 280/242 WC X |
| 4,235,297 | 11/1980 | Porta | 180/6.48 |
| 4,258,706 | 3/1981 | Shank | 297/180 X |
| 4,318,197 | 3/1982 | Drozd | 180/6.48 X |

FOREIGN PATENT DOCUMENTS

| | | | |
|---|---|---|---|
| 53-114148 | 10/1978 | Japan | 180/907 |

*Primary Examiner*—John J. Love
*Assistant Examiner*—Charles R. Watts
*Attorney, Agent, or Firm*—Moore & Hansen

[57] ABSTRACT

A hydraulically actuated, energy efficient wheelchair utilizes a pair of identical wheelchair drive units, with each unit having a constant speed battery powered electric motor driving a hydraulic pump and associated hydraulic motor. Hydraulic fluid flow between each pump and its hydraulic motor is controlled by the operator through the use of a solenoid actuated proportional control valve to determine the speed and direction of rotation of the hydraulic motor. One of these hydraulic motors is mechanically coupled to each wheelchair drive wheel. Means are provided to discharge excess pressurized fluid upstream of the hydraulic motor so as to minimize the backpressure on the pump and to thereby conserve driving energy and increase battery life. A method for hydraulically driving the wheelchair is also disclosed.

6 Claims, 3 Drawing Sheets

HYDRAULICALLY DRIVE WHEELCHAIR

BACKGROUND OF THE INVENTION

The invention relates to the field of self-propelled wheelchairs and comprises a highly efficient, battery powered, hydraulically driven wheelchair which requires substantially less battery power for propulsion than that needed for the all electric drive wheelchairs currently known to the art.

A self-propelled wheelchair can be a crucial possession for the permanently disabled or for one recovering from accident or illness and may sometimes be the only viable means for providing the mobility needed for normal daily activities. In recent years, wheelchair development has improved dramatically with the once manually actuated wheelchair now being superseded by chairs having electric drive motors connected to the wheels to allow patients who lack necessary arm strength or coordination to enjoy new mobility. While these known self-propelled chairs represent a significant improvement, their all electric drive systems encounter serious problems when confronted with prolonged slow speed operation or continual stopping and starting while operating on battery power. Typically, the electric drive wheelchairs are used in indoor corridors or public walkways among pedestrians, and consequently they cannot be operated at greater than walking speeds. Because the chairs are frequently operated indoors or in environments where low noise is essential, only electric storage batteries are practical for energizing such chairs. It seems probable that battery power will continue to be the principal means for energizing the self-propelled wheelchairs and that such power must be used more effectively. While the use of an internal combustion engine has been considered, it is generally not practical because of the presence of exhaust fumes, higher noise generation, and the potential problems of starting or stalling, which cannot be easily handled by a wheelchair operator. The problems of low speed wheelchair operation and the necessity of using a battery power source have placed challenging constraints on wheelchair design, and until the present invention, these problems have defied solution.

Current state of the art chairs use twin electric DC drive motors, with each motor being coupled to a drive wheel of the chair. A heavy storage battery is carried with the chair and is used to energize these motors. Each chair carries as large a storage battery as possible so as to increase the chair's cruising range and to require less frequent recharging of batteries.

Because self-propelled wheelchairs operate at such low speeds, the electric drive motors seldom operate at the optimum speeds for which they were designed, and they tend to overheat and are prone to burnout. These problems have resulted in the chairs being provided with large heat sinks and special motor controllers so as to dissipate the heat buildup and protect the motors from overload and burnout. These drive motors and heat dissipation systems are generally expensive, and repair or replacement of burned out or damaged components can be high cost items. Even with the best available heat dissipation systems, the motors always operate on the hot side and are prone to early failure. In many instances, the entire wheelchair must be brought to a service center for repair when any part of the drive system fails. It will be appreciated that when the electric motors operate at low speed, heavier than usual currents are drawn from the battery to start the D.C. motors and to sustain the low speed operation, resulting in reduced battery life. Still another highly challenging problem is that wheelchair operation has traditionally been limited to level surfaces and those surfaces having grades less than 7%. This can severely limit the areas and places accessible to the handicapped, and it is desirable to provide wheelchairs which can successfully traverse higher grades. It is common for electrically driven wheelchairs to be required to stop at 30 and 40 foot intervals while traversing a 7% grade simply to cool the motors. It is seldom convenient to stop the chair on a grade to cool the motors, and such difficulties, as a practical matter, discourage the use of the chair on even moderate grades. The higher levels of battery power consumption required by slow speed, uphill grade climbing further discourage the use of the presently available, all electric drive chairs on such grades.

It is desirable to provide an improved wheelchair drive system which can climb steeper grades, is not subject to overheating and needs less battery power than the currently used, all electric drive system. The present invention solves these problems and comprises a hydraulically driven wheelchair which increases battery life and significantly increases grade climbing ability.

SUMMARY OF THE INVENTION

The invention comprises a hydraulically driven wheelchair and the method of driving such a chair.

The disclosed hydraulic wheelchair utilizes a pair of hydraulic power units with each actuating one of the two drive wheels of the chair. Each power unit has a direct current, battery powered drive motor which runs at a substantially constant, optimum speed and is connected to rotate a hydraulic pump which builds the needed fluid pressure for wheelchair operation. Because the electric motor is either in an "off" condition or is running at its full rated, most efficient speed, it does not readily overheat, does not require special heat dissipation equipment, does not draw excessive, prolonged starting current, and requires far less battery power than prior art all electric drive wheelchairs.

The hydraulic pump supplies fluid to a solenoid actuated proportional control valve which controls the fluid flow direction and magnitude to a reversible hydraulic motor which is coupled to a wheelchair drive wheel. An identical direct current motor, pump, proportional control valve and hydraulic motor associated with the second power unit drive the second wheel. Depending on the control signal supplied from the operator to the control valve, the hydraulic motor can be propelled in a forward or rearward direction and its speed closely controlled. When the control valve is in a closed position, it provides an effective brake to prevent rotation of the associated wheel.

The hydraulic pump, control valve and hydraulic motor are sealed in a fluid reservoir which lubricates the systems, provides sound isolation, and absorbs the heat generated by the components. Heat absorbed by fluid in the reservoir is further utilized by pumping the heated fluid through one or more heating coils positioned in the chair seat and chair backrest in order to warm the often physically inactive occupant of the chair. The significantly improved performance of the hydraulic system over all electric drive systems has made it possible to operate the hydraulic wheelchair on grades in excess of 20% while still incurring significantly less battery drain than that associated with all electric drive wheelchairs under comparable conditions.

Further energy conservation is realized by utilizing a hydraulic circuit which dumps excess pressurized fluid from the pump back to the reservoir when the solenoid control valve is closed or is utilizing only a low fluid flow level. This feature reduces the fluidic backpressure applied against the pump and which would otherwise require extra battery power to overcome, thereby reducing pump wear and increasing battery life significantly.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENT.

Figure 1:
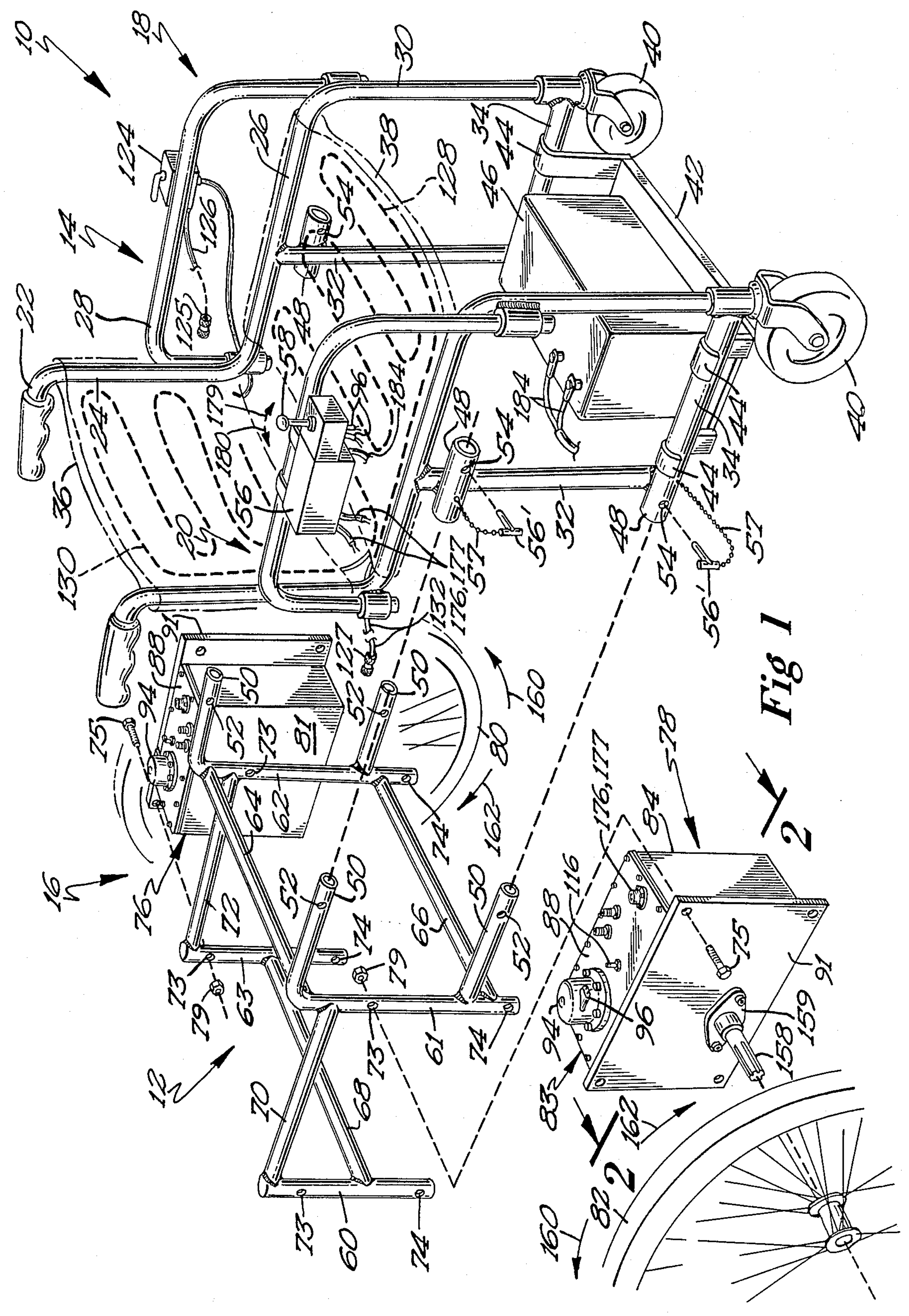
FIG. 1 is an exploded perspective view of an embodiment of a hydraulically driven wheelchair.

Referring now to FIG. 1, an embodiment 10 of a hydraulically driven wheelchair utilizes a framework 12 suitable for the support of a handicapped operator. The framework 12 may include any suitable framework capable of supporting an operator and able to carry the drive system described hereafter. The shown embodiment 10 utilizes a forwardly positioned operator support chassis 14 and a selectively detachable drive unit chassis 16 positioned at the rear of the chassis 14.

The operator support chassis 14 has left and right substantially identical rigid, tubular frame members 18 and 20, respectively. Each of the members 18 and 20 utilizes a rigid network of metal tubes or elements including a handle segment 22, upright back support segment 24, seat support segment 26, U-shaped arm rest segment 28, generally parallel spaced apart upright front and rear leg segments 30 and 32, respectively, and lower horizontal connecting segment 34, all joined as shown in FIG. 1 by welding, brazing or other means known to the art. A flexible webbed seat back 36 and flexible seat bottom 38 provide an operator chair and extend between and are carried by back support segments 24 and seat segments 26, respectively, so as to allow the left and right frame members 18 and 20 to converge on each other for storage or transport in a motor vehicle or the like. The upright front leg segments 30 rotatably retain a first pair of idler wheels 40 at the bottoms thereof for use in steering and support of the chair 10.

A generally flat, rectangular battery platform 42 has two pairs of outwardly directed hooks 44 which fit snugly but releasably over the horizontal connecting segments 34 and carry an electric storage battery 46 thereon. When the chair 10 is to be stored or transported, the hooks 44 are easily disengaged from the segments 34 and the battery and platform detached to allow folding and storage of the chair.

The rearward ends of the two connecting segments 34 extend cantileverly rearward beyond the upright leg segments 32 and define lower sockets 48 which slidably receive forwardly extending lower posts 50 when the drive unit chassis 16 is joined to the operator support chassis 14. A pair of upper sockets 48 are attached to rear leg segments 32 and are parallel to segments 34 to slidably receive therein the forwardly extending upper posts 50 of drive unit chassis 16. Each of the upper and lower posts 50 and its associated socket 48 are provided with transverse, communicating bores 52 and 54 which closely align when the two chasses are joined so as to receive a retention pin 56' through the bores 52 and 54 to releasably lock the chasses 14 and 16 together. The retention pins 56 and the communicating bores 52 and 54 collectively provide a means for releasably retaining the posts to the sockets during operation. It should be understood, however, that other means known to the art may be substituted for such pins and bores and all such alterations are within the purview of the invention. A lanyard 57 retains the pins to the chair to prevent their loss.

The operator support chassis 14 carries an electrical wheelchair steering control system 56 thereon in a position convenient to the operator, is energized from battery 46 through cable 84, and will typically include a control stick 58 which is easily manipulated with one hand by an operator to generate control signals and can be used to control the direction and speed of the chair.

The drive unit chassis 16 has four, spaced apart, generally parallel and upright rigid segments 60, 61, 62 and 63, with the front segments 61 and 62 being rigidly interconnected by upper and lower horizontal segments 64 and 66, respectively, which are welded to the segments 61 and 62. Rear segments 60 and 63 are rigidly interconnected by horizontal segment 68. Lateral horizontal segment 70 interconnects upright segments 60 and 61, and an identical lateral segment 72 interconnects upright segments 62 and 63. The earlier described pair of upper cantilever posts 50 extend horizontally, forwardly from and are rigidly fixed to upright segments 61 and 62 to be coaxially received in the upper sockets 48 of operator support chassis 14. Similarly, a substantially identical pair of forwardly extending lower cantilevered posts 50 extend from the intermediate region of each upright segment 61 and 62 and are positioned to be received coaxially within the lower sockets 48 of the chassis 14. Each of the upright segments 60, 61, 62 and 63 is provided with upper and lower transverse bolt apertures 73 and 74, respectively, positioned to allow hereafter described left and right housings 76 and 78, respectively, to be securely retained to the drive unit chassis 16 by bolts 75 and nuts 79. While a specific wheelchair framework has been described in conjunction with the embodiment 10, it should be understood that any alternative framework capable of supporting the hydraulic drive system of the invention may be substituted and all such variations are within the purview of the invention.

Referring again to FIG. 1, the embodiment 10 uses left and right substantially identical power units 76 and 78. Each power unit utilizes a housing for the mounting of the hereafter described components with left housing 81 being mounted to drive the left wheel 80 and right housing 83 to drive the right wheel 82.

The left and right housings comprise a housing system and each includes an interior chamber 85 which serves as a hydraulic fluid reservoir. These housings collectively comprise the housing system used to carry the drive components described hereafter. In view of the housings 81 and 83 being identical, only the right housing 83 will be described in detail.

Figure 2:
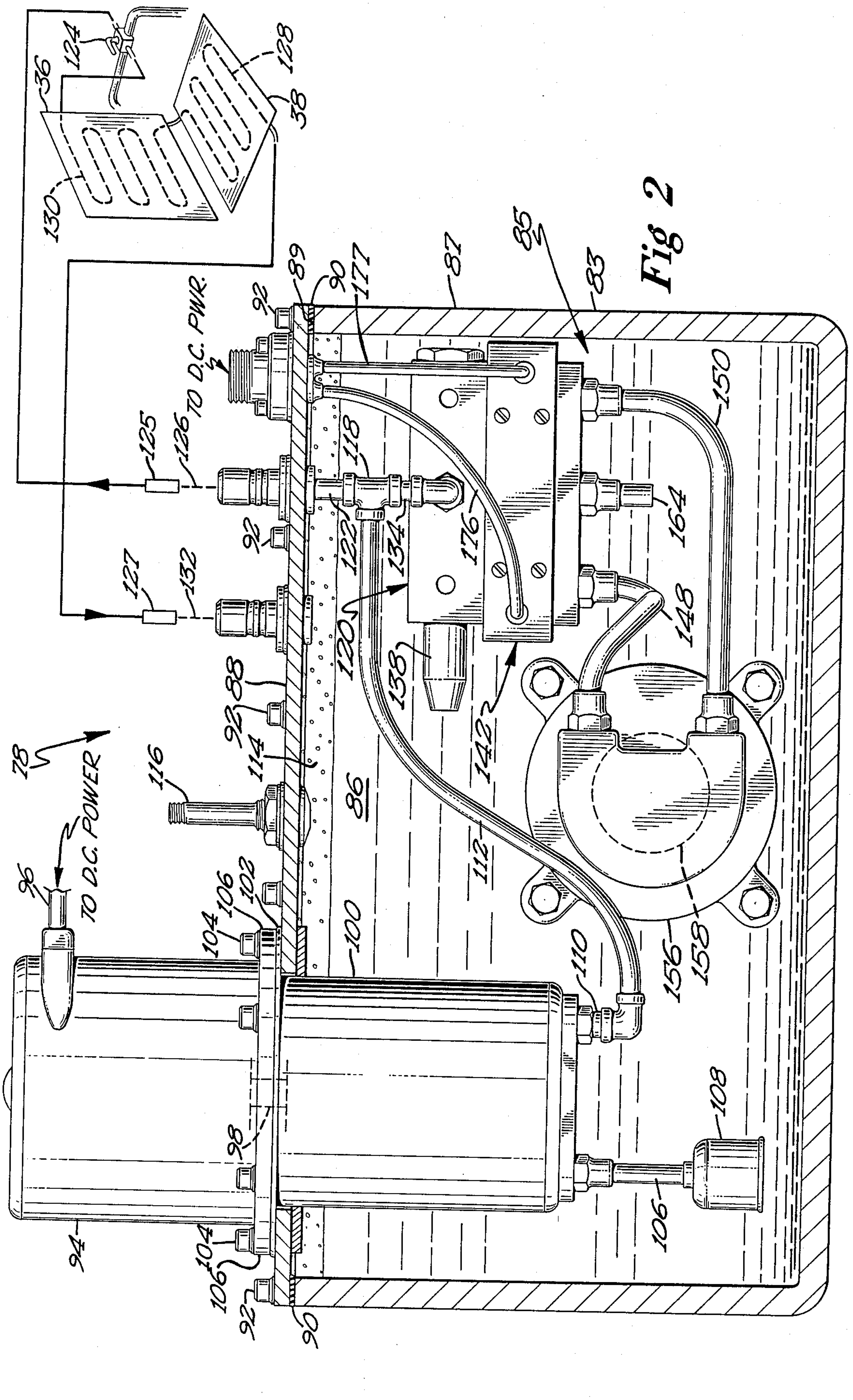
FIG. 2 is a cross sectional view of a housing containing components of the wheelchair drive system and taken in the direction of cutting plane 2—2 of FIG. 1.

Right housing 83 has a mounting plate 91 which is bolted securely to upright segments 60 and 61 by the bolts 75 and locking nuts 79. Referring now to FIGS. 1 and 2, the housing 83 comprises a generally upright rectangular metal container which has an interior chamber 85 filled with hydraulic fluid 86 and its open top closed by housing lid 88 which is tightly sealed against gasket 90 which rests on the housing lip 89. Bolts or screws 92 secure the lid to the lip 89.

A direct current motor 94 is mounted to the top of the lid 88 and energized through a power line 96 which extends from control system 56. Twelve volt motors on the order of five eighths horsepower have been found effective for use with the invention. The two shown direct current motors 94 and the connected battery power source 46 function as a power drive motor means usable with the embodiment 10. While this specific combination is effective, it should be understood that other motor combinations, including internal combustion engines, may be substituted where appropriate and are within the purview of the invention. The DC motor is operated at its full rated speed so as to insure normal motor operating temperatures and to maximize its use life.

The shaft 98 of the electric motor 94 is mechanically coupled to a hydraulic pump 100 which turns at the speed of motor 94 and is positioned within the hydraulic fluid reservoir 85 and immersed within the fluid 86. A gasket 102 is interposed between motor 94 and the upper side of the lid 88, and mounting bolts 104 are passed through lugs 106 on electric motor 94, through holes in the lid 88 and into threaded apertures in pump 100 to securely retain the DC motor and the hydraulic pump to the lid while tightly sealing the pump to the underside of the lid to avoid fluid leakage.

The hydraulic pump 100 has a hydraulic fluid inlet 106 connected through a filter or strainer 108 and has a hydraulic fluid outlet 110 from which hydraulic fluid is delivered to hydraulic pump line 112. It has been found helpful to introduce through gas valve 116 a quantity of pressurized gas, such as nitrogen, into the space 114 between hydraulic fluid 86 and lid 88. Such a gas charge tends to reduce unwanted hydraulic pump cavitation.

The hydraulic pump 100 of right drive unit 78 along with the comparable pump associated with left drive unit 76 collectively comprise one type of hydraulic pump means usable with the embodiment 10 to generate hydraulic fluid pressure to drive the left and right power units. It should be understood that various types of pumps and even a single combined pump may be utilized with the present invention and that such other variations and combinations are within the purview of the invention.

The hydraulic pump line 112 is connected through an upright tee fitting 118 to the inlet of manifold 120. A branch line 122 from tee 118 carries hydraulic fluid through a manually operated valve 124 and connector 125 of hydraulic line 126 which extends through a continuous heating coil comprised of a wheelchair seat heater coil segment 128 and back warmer coil segment 130, returning to the reservoir 85 through hydraulic return line 132 and connector 127.

Figure 3:
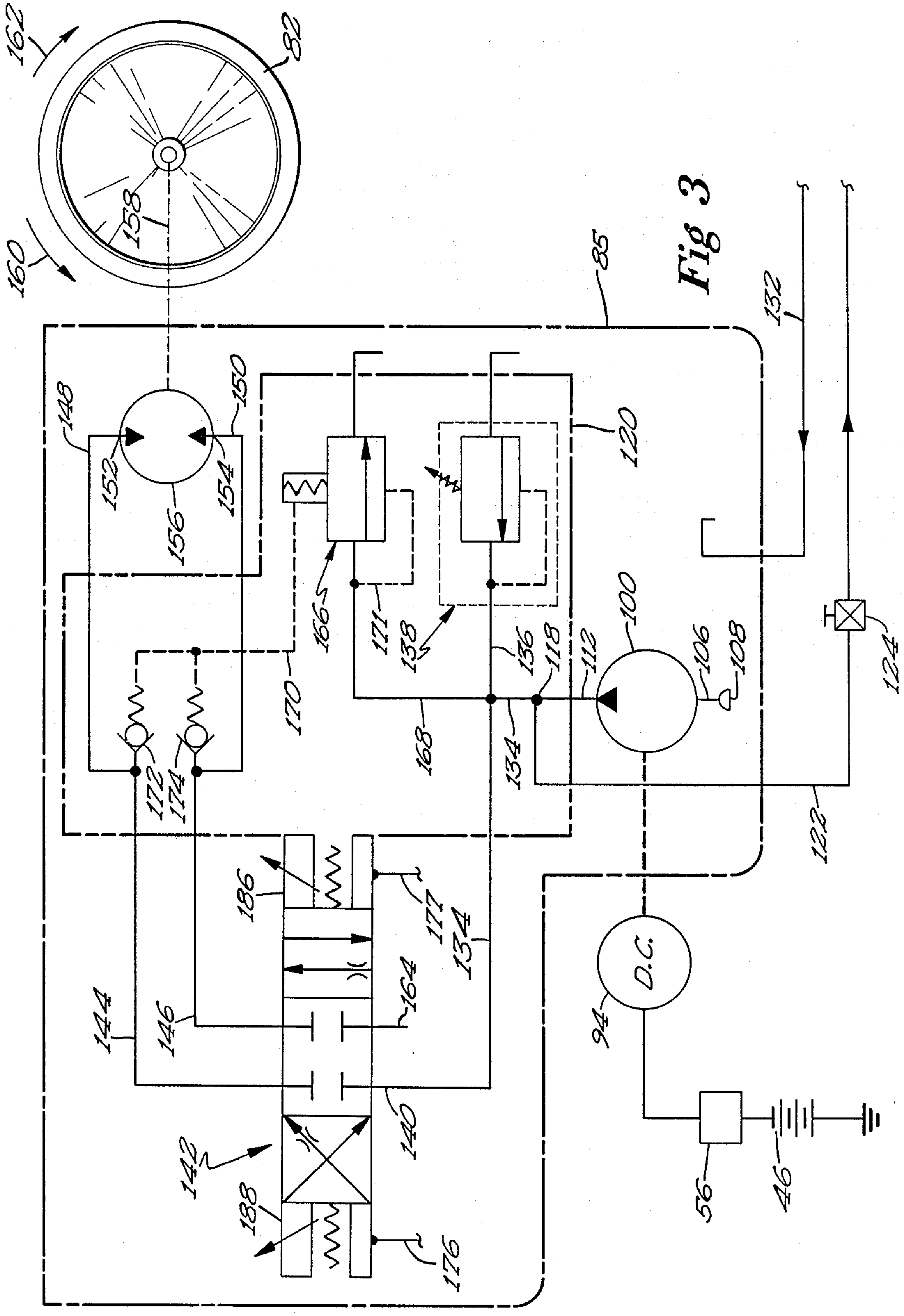
FIG. 3 is a schematic view of a hydraulic circuit and associated components usable to drive a wheel of the wheelchair of FIG. 1.

The manifold 120 contains a hydraulic circuit as shown in FIG. 3. Manifold inlet 134 joins first branch line 136 which leads to a high pressure hydraulic fluid relief valve 138 which is connected to discharge hydraulic fluid therethrough to the reservoir 85 when a predetermined maximum high pressure has been reached at the line 136. It has been found effective if the relief valve 138 is set to open when a pressure of 600 pounds per square inch is encountered on line 136. Because the construction and operation of such a high pressure relief valve is well known to the art, its internal structure will not be described further.

Hydraulic line 134 connects with the intake 140 of solenoid actuated proportional control valve 142. The valve 142 has first and second hydraulic fluid valve ports 144 and 146 which are connected through hydraulic lines 148 and 150, respectively, to the first and second motor drive ports 152 and 154, respectively, of a reversible hydraulic motor 156. The motor 156 is attached to the housing 83 and has its output shaft 158 mechanically coupled through a bearing 159 to the right wheelchair drive wheel 82.

The solenoid control valve 142 is an electric hydraulic proportional solenoid valve which both directs and meters the hydraulic fluid passing therethrough in response to electrical control signals sent to the solenoids to energize the valve. The valve utilizes a centrally positioned spring loaded spool which remains in the central position until urged to one side or the other by either of two solenoids. Energizing of either of the two solenoids displaces the spool valve a metered amount in a leftward or rightward direction so that flow through the valve can be varied from zero when the spool is in its central rest position to a gradually increasing amount as the spool is moved incrementally leftward or rightward. As shown in FIG. 3, displacement of the spool in a first direction will gradually increase hydraulic fluid flow between intake 140 and port 144 while displacement in the opposite direction will permit flow between intake 140 and port 146. The greater the displacement of the spool, the greater the quantity of hydraulic fluid which will pass through the valve. By controlling the position of the valve to permit outward flow through port 144 or port 146, the hydraulic motor can be driven in a forward wheelchair direction 162 or rearward direction 160.

It has been found that a proportional solenoid control valve of the type manufactured by Vickers, Incorporated of Troy, Mich. carrying their model designation KDG4V-3-2C works well with the described invention. Excess fluid which does not pass through the valve 142 during low fluid flow therethrough is discharged to the reservoir 85 through tank port 164.

Accordingly, the solenoid control valve 142 associated with housing 83 and the second valve 142 used in housing 81, as connected between their associated hydraulic pumps and motors, define first and second hydraulic fluid flow regulating units, respectively, and these two regulating units collectively comprise a means for regulating the speed and direction of rotation of the hydraulic motors, enabling an operator to control the wheelchair's direction and speed. While a specific valve 142 has been disclosed as being highly effective, it should be understood that other hydraulic valves, combinations of valves, servo motor control units or other devices known to the art, which may provide acceptable regulation of the fluid flow, may be substituted and are within the purview of the invention.

A low pressure relief valve 166 is connected to inlet 134 through branch line 168 and serves an important energy saving function in the hydraulic circuit. When the solenoid control valve 142 is closed or is passing very low levels of flow therethrough, the hydraulic fluid pressure across valve 142 could increase up to the discharge pressure of relief valve 138. If the pressure buildup across the valve 142 can be significantly reduced when valve 142 is partially closed, this will significantly reduce the backpressure applied to the pump 100 and the amount of battery energy needed to actuate the pump to overcome such pressure. The valve 166 solves this problem and greatly reduces battery power consumption by motor 94.

The low pressure relief valve 166 is spring loaded to remain in a fully closed position when the pressure drop across valve 142 is nominal as when the solenoid valve 142 is fully open. By keeping valve 166 closed when valve 142 is open, all fluid from pump 100 is routed directly through valve 142 to the hydraulic motor 156 to assure adequate flow for optimum motor performance. As the solenoid valve 142 begins to close, there will be an increasing pressure differential across the valve 142. A pilot line 170 extends from the relief valve 166 to each of two identical ball check valves 172 and 174. A second pilot line 171 extends from the valve 166 to line 168. The pilot lines 170 and 171 allow the valve 166 to sense the pressure differential across valve 142 and to adjust flow through valve 166 to respond to the pressure differential. Ball check valve 172 is connected to the hydraulic line 148 which extends between outlet valve port 144 and motor drive port 152 to sense fluid flow from the port 144 to the motor drive port 152. Similarly, ball check valve 174 is connected to the hydraulic line 150 which extends between valve port 146 and motor drive port 154 to sense fluid flow from the port 146 to the motor drive port 154. The ball check valves are spring loaded to remain normally closed and to open when a pressure differential of approximately 40 pounds per square inch is applied across the solenoid valve 142. When the valves 172 and 174 are open, the pressure between valve 142 and hydraulic motor 156 can be sensed along pilot line 170 and compared with the pressure in line 168. The valve 166 then progressively opens as the pressure across the valve 142 increases so as to pass fluid from line 168 through relief valve 166 and to the reservoir 85. As the pressure differential across the solenoid valve 142 increases, the relief valve 166 opens further so that when valve 142 is fully closed, sufficient fluid flow is passed through valve 166 so as to significantly diminish backpressure buildup in hydraulic line 134 against pump 100. Accordingly, the low pressure relief valve 166 and its associated downstream ball check valves 172 and 174 collectively comprise a dumping means by which excess hydraulic fluid pressure buildup between the pump 100 and the solenoid control valve 142 may be alleviated by routing hydraulic fluid through valve 166 and back to the reservoir. While a specific valve has been shown to accomplish this dumping function, it should be understood that any other structure suitable for such dumping and known to the art may be substituted, and all such variations are within the purview of the invention. The second hydraulic power unit 76 is identical to the unit 78 aside from being connected with the left wheelchair drive wheel and will not be separately described.

In operation, when a wheelchair operator desires to actuate the chair, he will first activate the electric control system 56 by manipulating control stick 58. It is well known in the self propelled wheelchair art to utilize a control system 56 to regulate the speed and direction of rotation of wheelchair drive wheels. Commercially available systems use a control sytem to generate control signals to electric drive motors to control the motor's speed. With the invention 10, a substantially constant current and voltage level equal to full battery output will be delivered to each electrical drive motor 94 through cables 96 when the control stick 58 is in any drive or nonstop position. When the stick is in a stop position, the current will be interrupted and the electric motors turned off. With this arrangement, the motors 94 will always be running efficiently at full rated speed and will not readily overheat. Such motor operation significantly reduces the load on the battery and prolongs battery life.

It is contemplated that forward movement of the control stick 58 in direction 179 will generate forward movement of the chair 10 by causing simultaneous forward rotation of wheels 80 and 82 in direction 162 as described further hereafter, while swinging of the control stick 58 in direction 180 will cause rearward rotation of the drive wheels in direction 168. Similarly, by moving the stick 58 laterally in a direction perpendicular to direction 180, the wheel 80 can be caused to move forwardly and the wheel 82 to move rearwardly, or vice versa, thereby causing the wheelchair 10 to pivot about its center. The extent of displacement of the stick 58 from its center position will determine the speed of wheel rotation. This type of control stick operation is well recognized and utilized in self propelled wheelchairs. The control system 56 is constructed to respond to the displacement of the control stick 58 to send a control signal along solenoid power cables 176 or 177 to each valve 142. The magnitude of the control signal can vary continuously from a small magnitude signal to produce low flow through valve 142 and slow wheel rotation up to a larger magnitude signal when the valve 142 is to be fully opened and maximum speed wheel rotation realized.

As the operator moves the control stick 58 in forward direction 179, the control system 56 closes an electric circuit to deliver direct current flow from battery 56 along electric cable 184 to the control system 56, and such current flow will then be delivered from the control system along cables 96 to the direct current motors 94 of the left and right power units 76 and 78.

As each of the direct current motors 94 is energized, it begins rotating at its rated angular velocity, and being supplied with a substantially constant current and voltage, will continue at substantially the same predetermined velocity. As the motors 94 rotate, the hydraulic pumps 100 mechanically coupled thereto rotate at the same velocity and develop hydraulic fluid pressure and flow. Each hydraulic pump 100 receives fluid 86 through filter 108 and inlet 106, expelling it under pressure from outlet 110 to deliver it to a manifold 120 through hydraulic line 112 at an operating pressure of approximately 200 pounds per square inch. The use of tee 118 permits an amount of hydraulic fluid to flow along line 122 and through selectively adjustable valve 124 to the heating coils 128 and 130 in the seat and back of the chair, respectively, to warm the operator. The excess heat which is eventually developed in the fluid 86 during normal operation can thus be dissipated and usefully employed to provide welcome warmth to the often inactive wheelchair occupant. The amount of fluid flow through valve 124 can be regulated or interrupted by manually closing the valve 124. Hydraulic fluid returns from the heating coils 128 and 130 along return line 132 and is discharged into the reservoir 85.

As the operator moves the control stick 58 outward from its center, off position, the control system 56 simultaneously sends control signals to the solenoid actuated proportional valve 142 along cable 176. For forward driving, the solenoid 188 will be actuated, causing fluid to flow through the valve 142 from hydraulic line 140 to line 148 to thereby drive the hydraulic motor 156 in forward direction 162. Fluid leaving the hydraulic motor passes along return line 150, back through valve 142 and then out tank port 164 to the reservoir 85. Depending upon the magnitude of the control signal to the solenoid 188, the moving spool of valve 142 will move a controlled and metered distance to closely control the rate at which hydraulic fluid passes through it to the hydraulic motor 156. By metering this fluid flow, the speed of the hydraulic motor can be closely regulated.

To actuate the hydraulic motor in the reverse direction 160, the control stick 58 is moved in reverse direction 180 and such movement generates a control signal from control system 56. The control signal is delivered to solenoid 186 along cable 177 causing the spool of the proportional control valve 142 to move in the opposite direction, resulting in fluid flow from line 140 to line 150. The fluid flow along line 150 drives the hydraulic motor 156 in direction 160. Fluid from the motor 156 returns along line 148 and passes through the valve 142 to be expelled through tank port 164 to the reservoir. The magnitude of the flow rate through the valve 142 is closely defined by the extent of movement of the solenoid 186 to control the speed of hydraulic motor 156. In the event that the valve 142 or motor 156 should fail and high pressure develops in the system, the high pressure relief valve 138 will sense pressure levels of 600 or more pounds per square inch and open to relieve the pressure by discharging pressurized fluid to the reservoir 85.

When the operator displaces control stick 58 slightly, for low speed operation of the chair, the proportional control valve 142 will be in a near closed condition, and consequently the hydraulic pump 100 can build up higher than needed pressures across the valve 142. These unneeded higher pressures are conveniently eliminated by the presence of the low pressure relief valve 166 which is responsive to any pressure buildup in excess of a predetermined valve, such as 40 pounds per square inch across the proportional valve 142 to open the valve 166. As the valve 166 opens, excess pressure buildup across solenoid valve 142 is discharged through valve 166 to the reservoir. As a result, the pressure against which the pump 100 must operate is significantly lowered and the quantity of electrical energy required to drive the motor 94 and pump 100 is reduced, resulting in significantly lower battery power use and prolonged motor, pump and battery life.

As the proportional valve 142 opens to permit greater quantities of fluid to pass therethrough to the hydraulic motor, the pressure drop across the valve 142 decreases, and this decrease is detected by the relief valve 166, causing the valve 166 to move toward its closed position to diminish the amount of fluid flow through valve 166. As valve 166 gradually closes in response to pressure drop across valve 142, more fluid flows into the valve 142, making such fluid available to energize the hydraulic motor 156 as higher speeds are needed.

When the operator elects to disassemble his chair 10 for automobile travel or storage, the operator extracts the four retaining pins 56' from the sockets 48 and slides the posts 50 of the drive chassis 12 from the sockets 48. The operator next disconnects the electric cables 176 and 177 and the hydraulic lines 122 and 132 at their connections 125 and 127. The drive chassis with its associated power units 76 and 78 can now be placed in the trunk of the vehicle or otherwise stored. The operator next lifts the battery platform 42 and the associated battery 46 from beneath the chassis 14 of the wheelchair, disconnects the battery line 184 from the control system 56, and places the battery in the vehicle for transport. The operator chassis 14 may now be folded and transported.

While the embodiment 10 has been shown as having the output shafts of hydraulic motors 156 coupled directly to the wheelchair drive wheels 80 and 82, it should be understood that a gear system may be interconnected between such hydraulic motors and drive wheels so as to increase or decrease the rotational speed of the wheels. Installation of such a transmission system allows an operator to shift between several different gear ratios to achieve greater control over the speed range of the chair.

While the embodiment of the invention, as shown in the drawings, utilizes a pair of direct current motors coupled directly to individual hydraulic pumps, it is possible to provide a workable variation in the invention by utilizing a single, larger direct current motor as the power drive motor means and have it coupled through a lower transmission system to drive two hydraulic pumps. In such an arrangement, it can be desirable to utilize a single larger housing system and a combined integral reservoir with the two pumps, the pair of proportional valves 142 and the hydraulic motors being positioned within the integral reservoir.

A further variation of the invention utilizes a single direct current motor as the power drive motor means and a single hydraulic pump coupled to the motor. The fluid output of the hydraulic pump can be routed to each of two proportional control valves 142 with each such proportional valve controlling the flow to its own hydraulic motor. With such an arrangement, it is preferred that a single enlarged housing be utilized with a single integral reservoir in which the single pump, the pair of proportional valves and the two hydraulic motors will be installed.

The invention also includes a method for driving a battery powered wheelchair utilizing an electric drive motor or pair of motors. In practicing the method, a direct current motor or motors, as earlier described, is utilized as the prime driving source, and the electric motor is energized to be run at a single optimum speed which would be the rated speed of the motor. By running the motor at its rated speed, the motor runs most efficiently, is not prone to overheat and realizes a maximum use life. It is important to avoid using the motor at speeds significantly below its rated speed, because low operating speeds tend to draw excessive currents from the battery and to overheat the motor. It should be understood, however, that some motors are designed to operate over a range of speeds, and any speed within the assigned range of the motor can be utilized with the invention, so long as excessively low speeds are avoided.

The described electric drive motor is coupled to a hydraulic pump means and used to drive the hydraulic pump and thereby circulate hydraulic fluid through a hydraulic circuit connected with the pump. The pump means can include a single pump or a pair of such pumps. A pair of hydraulic motors are coupled mechanically to the drive wheels of the wheelchair, and each of these pumps is connected in fluid flow relationship with the pump to permit the pump to power the hydraulic motors and thereby rotate the wheels of the chair. The driving method also includes regulating the rate of fluid flow and direction of flow which enters each of the two hydraulic motors so as to control the speed and direction of rotation of the hydraulic motor output shafts and the wheelchair drive wheels. This regulation has been effectively accomplished by the use of the earlier described solenoid actuated proportional control valves.

To achieve additional operating efficiency, the method can further include the step of dumping excess pressurized fluid from the hydraulic pump back to the reservoir upstream of the hydraulic motor so as to reduce backpressure on the pump when the chair is moving at low speeds and low levels of fluid are moving through the control valves.

The method may also include the step of pumping warmed hydraulic fluid through a heating coil located in the seat back and seat bottom of the chair, so as to transfer otherwise wasted heat from the reservoir to the seat where it can provide needed warmth for an often inactive operator.

While the preferred embodiment of the present invention has been described, it should be understood that various changes, adaptions and modifications mav be made therein without departing from the spirit of the invention and the scope of the appended claims.

What is claimed is:

1. A hydraulically driven wheelchair capable of using hydraulic fluid and usable by an operator, comprising:

a wheelchair framework including a chair capable of supporting the operator and further including at least one idler wheel;

a housing system carried by said framework and including a hydraulic fluid rservoir for storing hydraulic fluid therein;

power drive motor means carried by said housing system;

hydraulic pump means mechanically coupled with said power drive motor means to acutate said pump means, said pump means including a hydraulic fluid inlet positioned within said reservoir and further including a hydraulic fluid outlet;

a first reversible hydraulic motor having an output shaft, said motor fixed to said housing system and connected in fluid flow relationship with said pump means to rotate said output shaft of said first motor in response to fluid flow through said first motor;

a second reversible hydraulic motor having an output shaft, said second motor fixed to said housing system and connected in fluid flow relationship with said pump means to rotate said output shaft of said second motor in response to fluid flow through said second motor;

first and second wheelchair drive wheels mechanically coupled with said output shafts of said first and second hydraulic motors, respectively, to rotate said wheelchair drive wheels in response to rotation of said motor output shafts;

a wheelchair steering control for generating control signals, said control system being carried by said framework and accessible to the operator;

means for regulating the speed and direction of rotation of said first and second hydrualic motors, said regulating means being connected with said control system and responsive to said control signals from said steering control system so as to permit the operator to steer the wheelchair and control wheelchair direction and speed; and means for dumping pressurized fluid to said reservoir, said dumping means, in response to a predetermined level of pressure buildup across said regulating means, causing pressureized fluid from said pump means to flow directly to said reservoir, thereby diminishing back pressure against said pump means and reducing energy consumption by said power drive motor means when the wheelchair is moving at low speeds.

2. A hydraulically driven, electrically powered wheelchair capable of using hydraulic fluid and usable by an operator, comprising:

a wheelchair framework including a chair capable of supporting the operator and further including at least one idler wheel;

a housing system carried by said framework and including a hydraulic fluid reservoir for storing hydraulic fluid therein;

power drive motor means carried by said housing system and including a first D.C. electric motor and a battery;

hydraulic pump means mechanically coupled with said D.C. motor to actuate said pump means, said pump means including a hydraulic fluid inlet positioned within said reservoir and further including a hydraulic fluid outlet;

a first reversible motor having an output shaft, said first hydraulic motor fixed to said housing system and connected in fluid flow relationship with said pump means to rotate said output shaft of said first hydraulic motor in response to fluid flow through said first hydraulic motor;

a second reversible hydraulic motor having an output shaft, said second hydraulic motor fixed to said housing system and connected in fluid flow relationship with said pump means to rotate said output shaft of said second hydraulic motor in response to fluid flow through said second hydraulic motor;

first and second wheelchair drive wheels mechanically coupled with said output shafts of said first and second hydraulic motors, respectively, to rotate said wheelchair drive wheels in response to rotation of said first and second hydraulic motor output shafts;

a wheelchair steering control system for generating control signals, said control sytem being carried by said framework and accessible to the operator;

means for regulating the speed and direction of rotation of said first and second hydraulic motors, said regulating means being connected with said control system and responsive to said control signals from said steering control system so as to permit the operator to steer the wheelchair and control wheelchair direction and speed; and a fluid heating coil positioned in said chair and being connected in fluid flow relationship with said pump means and said reservoir to selectively move warm, hydraulic fluid from said pump means through said heating coil to supply heat to the operator and return the fluid to said reservoir.

3. A method for driving a wheel of a battery powered wheelchair having an electric drive motor so as to reduce excess electric energy consumption associated with low and varying electric motor speeds comprising the steps of:

energizing the electric drive motor with an electric battery to drive the electric motor at a substantially constant, efficient speed where the motor does not overheat;

mechanically driving a hydraulic pump with the electric drive motor and connecting the pump with a hydraulic fluid reservoir to generate pressurized hydraulic fluid;

mechanically coupling a hydraulic motor to a wheelchair drive wheel and connecting said hydraulic motor in fluid flow relationship with the hydraulic pump;

regulating the rate and direction of flow of fluid from the pump to the hydraulic motor to control the speed and direction of rotation of the wheelchair drive wheel; and dumping excess pressurized fluid from the pump back to the reservoir when the wheelchair wheel is moving at low speed so as to reduce back pressure buildup on the pump and thereby reduce electrical energy required by the electric motor to drive the pump.

4. The method of claim 3 and further including the step of conducting warmed hydraulic fluid to an operator heating coil to transfer otherwise wasted heat to warm the operator.

5. A hydraulically driven wheelchair capable of using hydraulic fluid and usable by an operator, comprising:

a wheelchair framework including a chassis capable of supporting the operator and further including at least one idler wheel;

a housing system carried by said framework and including a hydraulic fluid reservoir for storing hydraulic fluid therein;

power drive motor means carried by said housing system;

hydraulic pump means mechanically coupled with said power drive motor means to actuate said pump means, said pump means including a hydraulic fluid inlet positioned within said reservoir and further including a hydraulic fluid outlet;

first and second hydraulic, proportional control valves, each said valve having a hydraulic fluid intake connected in fluid flow relationship with said outlet of said pump means and each said control valve further including first and second valve outlet ports, each said control valve being constructed and arranged to selectively pass a controllable and variable quantity of hydraulic fluid from said valve intake to one of said first and second valve outlet ports in response to control signals to said valve so as to control the magnitude and direction of fluid flowing out of one of said first and second valve outlet ports;

a first reversible, hydrualic motor fixed to said housing system and having first and second motor drive ports connected in fluid flow relationship with said first and second valve outlet ports, respectively, of said first control valve to rotate said first motor in forward and rearward directions in response to fluid flow into said first drive port and into said second drive port, respectively;

a second, reversible hydraulic motor fixed to said housing system and having first and second motor drive ports connected in fluid flow relationship with said first and second valve outlet ports, respectively, of said second control valve to rotate said second motor in forward and rearward directions in response to fluid flow into said first drive port of said second hydraulic motor and into said second drive port of said second hydraulic motor, respectively;

first and second wheelchair drive wheels mechanically coupled with said first and second hydraulic motors, respectively, to rotate said wheelchair drive wheels in response to rotation of said hydraulic motors;

means for dumping pressurized fluid, said dumping means in response to a predetermined level of pressure buildup across said regulating means causing pressurized fluid from said pump means to flow directily to said reservoir, thereby diminishing back pressure against said pump means and reducing energy consumption by said power drive motor means when the wheelchair is moving at low speeds; and a control system mounted on said framework and accessible to the operator for energizing said power drive motor means and for actuating said first and said second control valves to cause controlled fluid flow between said valve outlet ports of said first and said second valves and said motor drive ports of said first and second hydraulic motors, respectively, so as to selectively rotate said wheelchair drive wheels and to control the direction of rotation and speed of said drive wheels.

6. The hydraulically driven wheelchair of claim 5 wherein said power drive motor means includes an electric motor and an electric storage battery electrically, selectively connected to said motor and in response to actuation by the operator energizing said motor to run at a substantially constant efficient speed at which said motor does not overheat.

* * * * *